United States Patent

[11] 3,594,863

[72] Inventor George H. Erb
 Cuttingsville, Vt.
[21] Appl. No. 840,679
[22] Filed July 10, 1969
[45] Patented July 27, 1971
[73] Assignee American Velcro, Inc.
 Manchester, N.H.

[54] APPARATUS FOR MOLDING PLASTIC SHAPES IN MOLDING RECESSES FORMED IN A MOVING ENDLESS BELT
24 Claims, 25 Drawing Figs.

[52] U.S. Cl. .................................................. 18/5, 18/21
[51] Int. Cl. ....................................................... B29c 3/02
[50] Field of Search .............................................. 18/5 M, 5
 A, 5 BE, 5 BH, 5 BZ, 12 TB, 12 TF, 12 TM, 21, 1 Z

[56] References Cited
UNITED STATES PATENTS
3,196,490 7/1965 Erb ............................... 18/21
3,372,080 3/1968 Billarant ....................... 18/5 X

Primary Examiner—Traivs S. McGehee
Attorney—James D. Bock

ABSTRACT: Apparatus for continuously forming extruded strips of plastic material with molded pilelike protuberances integral therewith. Protuberances may have almost any desired shape but as disclosed are in the form of hooks and loops which may be used as the hook and loop parts of flexible fasteners such as the well-known "Velcro" fasteners. For the latter use the strips and molded protuberances made on this apparatus are secured to a base web of flexible sheet material to produce a final product in which there are closely spaced rows of pilelike hooks and/or loops. The means for forming the strips and protuberances include continuous parallel grooves formed in an endless belt which is moved lengthwise through an extruder nozzle having entrance and exit lips pressed against the belt. The lips are shaped to correspond with the belt and to fit into the grooves and over the ridges between the groves in such manner that molten plastic material will be extruded in form of strips. Protuberances are formed in shallow elongated cavities formed in walls of grooves or ridges in belt. Exit lip will scrape all molten material from the belt other than in the cavities or on surfaces where extruded strips lie. A major advantage of the disclosed structure is that protuberances of very thin elongated form are molded without need for high injection pressures since the plastic material is laid in shallow elongated open troughs rather than being forced to enter deeply sunk elongated holes of small cross section. The lips of the extruder nozzle are formed of nonporous foam metal with contours fitting as desired into the grooves of the belt, the formation of such contours being effected by pressing and crushing the foam metal against the belt at a pressure considerably exceeding the pressure thereafter exerted between lips and belt under service conditions.

APPARATUS FOR MOLDING PLASTIC SHAPES IN MOLDING RECESSES FORMED IN A MOVING ENDLESS BELT

BACKGROUND OF THE INVENTION

Pile fabrics and ribbons conventionally are woven on looms and are provided for decorative and utilitarian purposes. Various forms of molded or compositely constructed pilelike fabrics with similar purposes have found uses in industry. A specialized form of pile fabric has been used for the manufacture of separable fasteners of the hook and loop type sold under the trademark "Velcro." When such fasteners are manufactured in accordance with U.S. Pat. Nos. 2,717,437 or 3,009,235 to De Mestral the pile fabrics are formed by weaving endless ribbons with special warp to form the loops or hooks. When hooks are made they customarily are made from special warps of nylon monofilaments which are first woven in the form of upstanding loop pile elements and are thereafter heat-set in loop formation after which one leg of each loop is cut to leave an open-ended hook available to act as a fastening element. In U.S. Pat. No. 3,196,490 to Erb, a machine is disclosed for continuous molding of fastening elements similar to the well-known "Velcro" fasteners which is particularly effective in the formation of the hook pile for such fasteners by the use of a series of relatively moving die plates with hook-shaped molding recesses. The plates are pressed into a compact group and moved through an extruder for reception of molten plastic material in the molding recesses. After solidification of the molded hooks the die plates are separated to permit withdrawal of the hooks. For the loop part of fasteners such as the "Velcro" fasteners mentioned above it is preferable, as pointed out in said U.S. Pat. No. 3,009,235, to provide a very large number of closely packed loops as in an astrakan fabric and this is done by weaving the pile from multifilament yarns which are brushed out to separate the individual filaments into multitudinous very fine loops. The brushed out fabric is then heat-set to maintain it in the brushed out condition. Molded pilelike structures such as foot wipers, bristle brushes and automobile floor carpet have been made on various devices including die plates or rollers into which molding recesses are sunk. The length of the pile elements which can be formed in such sunk recesses and especially the length as related with small cross-sectional dimensions, have been quite limited because of the difficulty in filling the recesses with the molten material and the subsequent difficulty of removing the molded articles from the recesses. Thus, in general, only rather coarse bristlelike or lumpy, textures with rather widely spaced elements have been made by such procedures.

BRIEF DESCRIPTION OF THE INVENTION

The present invention provides rapid and continuous production by injection molding and extrusion techniques of fabriclike pile products in which the pile elements may be very closely spaced and may have extremely great lengths as compared with the cross-sectional dimensions thereof. The present invention utilizes an endless belt having grooves extending longitudinally thereof and having shallow troughlike molding recesses sunk into the walls of the grooves or the ridges lying between grooves. To form a pile element of very great length and very small diameter it is only necessary to form a long shallow scratchlike depression in the wall of a groove or ridge and then to arrange to lay molten plastic material into such recess from the long open side thereof. Thus very low pressure may be used on the extruder in contrast with high pressure required to force molten plastic into deep narrow holes. The belt of the present invention is conducted lengthwise through a nozzle of an extruding device which has lips shaped to conform to the belt, fitting into the grooves and thus serving as scrapers to remove plastic from all surfaces where it might not be desired. The deposited plastic lying in the tiny mold recesses can be easily removed after solidification. While discrete pile elements could be formed in accordance with the present invention they would, if very small, be difficult to retrieve and to place in any organized fashion upon a fabric. While such technique can be used for making random flocklike fabrics the present invention ordinarily would be expected to be devoted to the manufacture of products having organized pattern arrangement of the pile elements. Therefore it is preferred to mold the pile elements integrally with ribbons or strips of the same plastic material by extruding such strips through appropriate slits arranged to communicate with the pile element molding recesses described above. In one modification of the present invention a very large number of narrow ribbons of extruded plastic are formed which have molded hook pile elements extending upwardly from opposite edges thereof. Such ribbons are then secured to a fabric base to form the hook part of a fastener element very similar in appearance and function to the woven "Velcro" fasteners. In another modification of the present invention a large number of parallel continuous strips are extruded and adjacent strips are interconnected by a network of loop elements which may extend in various directions and dispositions making closely related rows of loops for decorative uses or for use as the loop part of flexible fasteners.

DESCRIPTION OF PREFERRED EMBODIMENTS

Figures 1, 6:
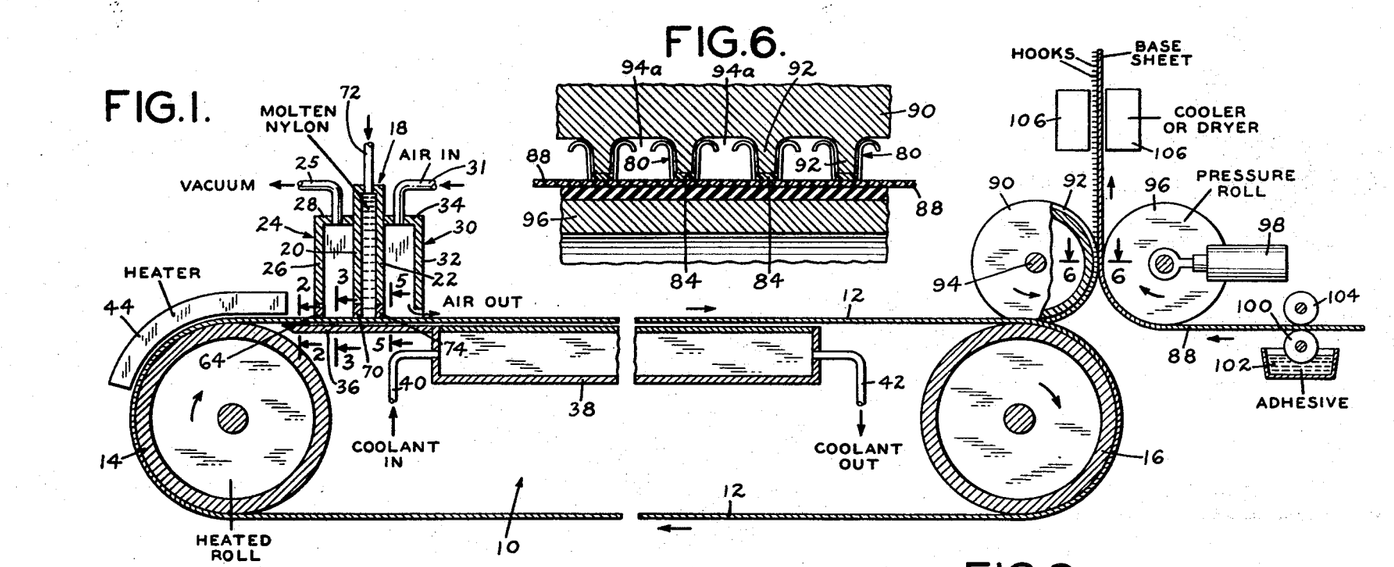
FIG. 1 is a side elevational view with many parts in section of one form of machine embodying the present invention.
FIG. 6 is a horizontal sectional view taken along the line 6–6 in FIG. 1.

A first machine embodying the invention is shown in FIG. 1 and a typical product which can be made on that machine is shown greatly enlarged in FIGS. 7 through 11. The illustrated typical product is quite small because it is intended to be used as the hook part of a hook and loop fastener generally similar to that disclosed in U.S. Pats. Nos. 2,717,437 and 3,009,235 mentioned above. While specific dimensions may vary quite widely, in an illustrative example the hook-shaped pile elements may have cross-sectional dimensions of about 0.008" and they may stand about 0.06" high from a base sheet which is only a few thousandths of an inch thick. In the final product the hooks are quite closely spaced so that there are possibly several hundred hooks per square inch of area of the product. The dimensions aforesaid are presented for better understanding of the features of the apparatus shown in FIG. 1 and the related figures of the drawings.

Referring now to FIG. 1 there is shown in somewhat diagrammatic form a machine 10 including an endless belt 12 guided around spaced parallel rolls 14 and 16 either or both of which may be driven by suitable power means, not shown, to move the belt 12 through an endless path in the direction indicated by the arrows in said FIG. 1. The machine includes an extruder nozzle 18, comprising entrance and exit walls 20 and 22 respectively, which, with suitable end closure walls, not shown, define an elongated narrow orifice which extends transversely of belt 12 for any desired distance up to the full width thereof.

Upstream of the extruder nozzle 18 there is positioned a vacuum chamber 24 which is coextensive in width with nozzle 18. Vacuum chamber 24 is enclosed by an entrance wall 26, the entrance wall 20 of nozzle 18, end walls, not shown, and a top wall 28. This chamber 24 is connected by a line 25 with a suitable vacuum pump, not shown.

Downstream of the nozzle 18 there is positioned a cooling air chamber 30 defined by an exit wall 32, the exit wall 22 of nozzle 18, end walls, not shown, and a top wall 34. This chamber 30 is connected by a line 31 with a source of air under pressure, not shown, which air may be refrigerated if so desired.

Throughout the zone beneath nozzle 18 and associated vacuum and air chambers 29 and 30 the belt 12 is supported by a rigid smooth-surfaced plate 36. Downstream of plate 36 the belt 12 is conducted over a cooling chamber 38 with supply and exhaust lines 40 and 42 respectively for a coolant fluid.

Upstream of the support plate 36 the guide or drive roll 14 for belt 12 is preferably heated so as to transfer heat to belt 12 as it approaches the extruder nozzle 18. Also, there may be provided a heater 44 arranged to supply heat to belt 12, for example, by radiation from suitable radiant heating elements, not shown, enclosed in heater 44.

Figure 2:
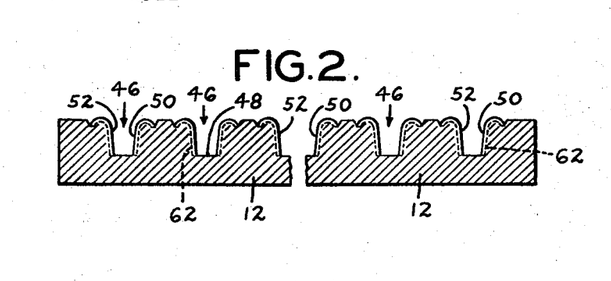
FIG. 2 is a vertical sectional view taken along the line 2–2 in FIG. 1.

Referring now to FIG. 2 there is shown, greatly enlarged, a transverse sectional view of the belt 12. The belt is made of some suitable metal, stainless steel for example, and ordinarily will be many times wider than it is thick. When the machine is set up to manufacture hook parts for flexible fasteners of the general size discussed hereinabove the belt 12 may be about 0.125" thick. Width is entirely optional although, of course it should be wide enough to form a reasonably large number of rows of hooks. Commercial versions of the woven "Velcro" fastener now being widely sold come in widths of 1", 1½", 2" and so on. The machine of the present invention could be sized to make single-ribbon products of such wide range. However, the machine also can be made much wider so as to produce a web which later can be slit into many strips of conventional or any other desired width.

The belt 12 may be made endless by welding a transverse seam. On the other hand, since the total length of the belt is not very great, it is entirely practical to make the belt seamless by cutting it as an endless band from a tube of stainless steel of appropriate thickness and external diameter.

The belt 12 as shown in FIG. 2 is provided with a plurality of parallel grooves 46 running lengthwise of the belt and penetrating it for a reasonable distance, say not more than about half the thickness of the metal from which the belt is made. The grooves 46 may be formed in the belt 12 by any suitable machining process. For example they may be individually formed by a milling cutter of appropriate shape which is used repeatedly until a sufficient number of grooves has been formed. Alternatively a cylindrical milling cutter with several sets of cutting teeth may be utilized whereby to form several parallel grooves 46 on each pass. Instead of milling, other appropriate procedures such as grinding may be preferred in some instances. It should be noted at this point that it is not necessary that the grooves 46 be precisely spaced throughout the width of the belt 12. Reasonable accuracy in spacing is desirable for the particular product illustratively being shown herein but precise spacing is not necessary because of the special manner in which the scraper elements or nozzle lips which cooperate with the belt are made to fit the belt irrespective of lack of precision therein. This aspect of the invention will be discussed in greater detail below.

As shown in FIG. 2 each of the grooves 46 has a particular conformation appropriate for the intended purpose. As shown in the much more greatly enlarged FIG. 4, a groove 46 has a bottom wall 48, and outwardly divergent sidewalls 50 and 52 each of which fairs into a generally semicylindrical portion 54 and 56 respectively. The portions 54 and 56 terminate in an intersection with outwardly inclined wall portion 58 and 60 respectively. The grooves as so far defined are what is formed in the belt by the milling or other techniques described above and it will be apparent that a cutter or grinder of suitable contour may be employed for this purpose.

Figure 4:
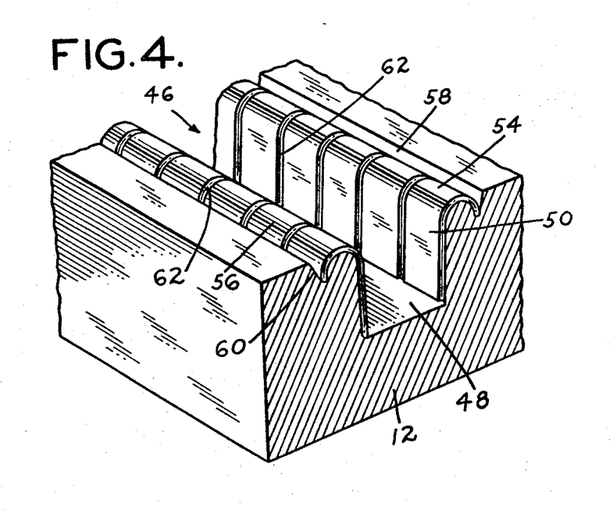
FIG. 4 is a greatly enlarged perspective view of a fragment of an endless belt die showing a portion of one groove and a few of the molding recesses associated with that groove.

Each groove 46 has formed in the sidewalls 50 and 52 thereof and continuing upwardly and over the semicylindrical portions 54 and 56 a plurality of generally vertically disposed molding recesses 62 in which the hook-shape pile elements are to be formed. It will be noted that each molding recess 62 is extended downwardly to terminate in the same plane as that of the bottom wall 48 of the groove 46. Each molding recess 62 may be generally semicylindrical in cross section since this is an easy shape to form and it lends itself to clean stripping of the hooks molded therein. The cross section of recesses 62 may be generally rectangular or triangular if so desired. In selecting the cross section for the molding recesses 62 it must be kept in mind that plastic material which is molded therein and solidified must be withdrawn from the mold so whatever cross section is selected it must be free of undercuts and must have a reasonable amount of draft. It will be understood that the molding recesses 62 are relatively closely spaced throughout the length of every groove 46 in the belt 12.

Forming of the molding recesses 62 in the walls of the grooves 46 may be performed by spark etching as is customary in die sinking. As will be understood each molding recess 62 may be formed individually my a manually guided spark etching tool but such procedure would require a great deal of time, and an automatically operating device with appropriate guides and jigs is preferred. In any event it will be understood that the process of spark etching causes a local vaporization of the metal in the vicinity of a high energy spark or arc and that recesses having extremely smooth surfaces may be rapidly sunk by skilled operators or suitably programmed automatic machines.

Referring back to FIG. 2 and bearing in mind that this sectional view is taken looking upstream of the path of travel of belt 12 at section line 2–2 in FIG. 1, it will be appreciated that the upper grooved surface of belt 12 is exposed to the ambient atmosphere. Assuming such atmosphere to be air it will be apparent that a certain amount of air will be occluded upon and carried along with the surface of belt 12 and that air will be included in each of the molding recesses 62. The vacuum chamber 24, see FIG. 1, is provided to reduce the amount of such occluded and included air before the belt 12 enters the extruder nozzle 18 thus to expedite entry of molten plastic material into the tiny mold recesses 62.

Figure 3:
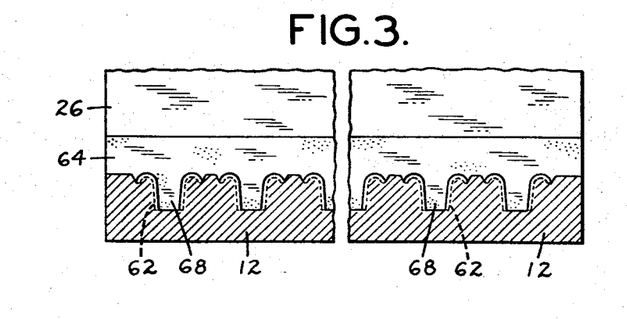
FIG. 3 is a vertical sectional view taken along the line 3–3 in FIG. 1.

Referring now to FIG. 3 the belt 12 is shown passing beneath the upstream or entrance wall 26 of vacuum chamber 24. The wall 26 includes a lip portion 64 the lower surface of which is contoured to make a snug sliding fit with all of the surface contours of the upper side of belt 12. The lip portion 64 may be integral with the remainder of wall 22 and the contours of the lower surface may be imparted by suitable milling or grinding technique. However, in the preferred forms of this invention the lip portion 64 is made of nonporous foam metal secured along the lower edge of wall 22 and the contour of the lower edge of such foam metal lip portion 64 is imparted by a crush forming technique which is diagrammatically illustrated in FIGS. 20, 21 and 22.

Figures 14, 18, 19, 20, 21, 22:
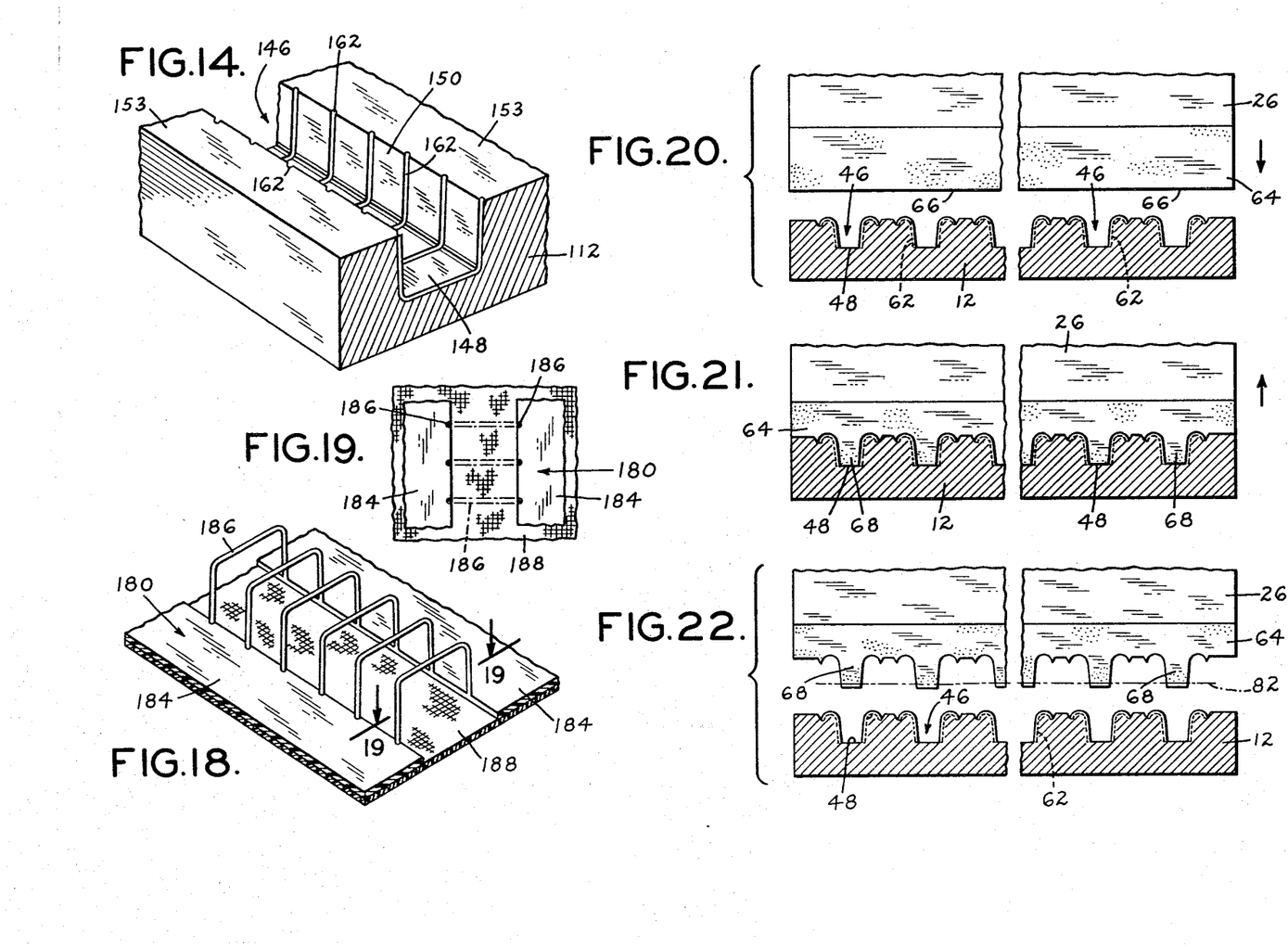
FIG. 14 is a greatly enlarged view similar to FIG. 4 but showing a different arrangement of groove with molding recesses for a belt intended to be used in the modified machine shown in FIG. 12.
FIG. 18 is a greatly enlarged perspective view of a fragment of a final product comprising strips and loops extruded and molded in a belt such as that shown in FIG. 14.
FIG. 19 is a horizontal sectional view taken along the line 19–19 in FIG. 18.
FIGS. 20, 21 and 22 are diagrammatic views illustrating the procedural steps for forming one type of nozzle lips from a foam metal body.

Referring now to FIG. 21 the wall 26 is shown with a lip portion 64 secured thereto along the lower edge. The lip portion 64 at this time has a straight lower edge 66 and thus constitutes a blank from which a suitably contoured lip is to be formed.

The foam metal for lip portion 64 is chosen from the many products available on the market on the basis of desired bearing characteristics and density as well as its nonporosity. The latter is characteristic of foam metals having closed bubbles with the metal in a continuous phase. Bearing characteristics follow usual rules, illustratively, for use with a stainless steel belt the foam metal may be brass. Density of a foam metal made from a particular metal or metal alloy affects the strength of the foam, under compression for example. Thus the density of the metal selected for use in this invention is so selected that the lip portions made thereof will have adequate strength in compression to resist crushing under the maximum expected pressure under which the lips are to be pressed against the belt 12 in service. As will be further explained, the service pressure need not be very great. For the present invention the foam metal should be crushable at mechanical pressures somewhat higher than the expected service pressure.

To impart desired contour to the lip portion 64 of wall 26, see FIG. 20, the particular belt 12 which is to be used with the contoured lip is set up on a pair of guide rolls such as or similar to the rolls 14 and 16 (FIG. 1). A portion of the upper reach of the belt 12 is guided over a support plate such as or similar to the support plate 36 (FIG. 1). The belt 12 is then driven through its endless path at a relatively slow speed and the wall 26 with the blank lip portion 64, as shown in FIG. 20, is pressed downwardly, with accurate vertical guidance upon the ribbed surface of the belt 12. Sufficient vertical pressure is gradually applied to cause progressive local crushing of the foam structure of lip portion 64 until the lower edge 66 thereof reaches the bottom walls 48 of all of the grooves 46. When this is accomplished the lip portion 64 will have been forced to assume the exact contour of the belt 12 as shown in FIG. 21. The continuous lengthwise movement of belt 12 during this operation will cause rubbing of the surface of the belt 12 against the foam metal in contact therewith resulting in a desirable burnishing effect on the affected surface portions of the foam metal. Also, the continuous movement of the belt 12 prevents the foam metal from entering or assuming the contour of the molding cavities 62 formed in grooves 46 of the belt.

The crushing and burnishing operation will cause collapse and/or distortion of the bubbles in the foam structure immediately adjacent the surfaces thereof which are progressively changed in shape and the metal parts of the structure will be bent beyond the elastic limit thereof. Consequently, after the lip portion 64 has reached the position shown in FIG. 21 the wall 26 with the permanently distorted foam metal lip 64 may be removed from the belt as shown in FIG. 22. The lip portion 64 now has a permanent contour including projections 68 which correspond with grooves 46 and other corresponding portions whereby the lip mates with the contour of the ribbed surface of belt 12. Thus for use in service in the apparatus shown in FIG. 1 the belt 12 may be moved lengthwise relative to lip portion 64 of the wall 26 with a snug sliding fit. As mentioned above the fact that the lip portion 64 is contoured by actual contact with the particular belt 12 with which it is to be used makes it unnecessary to manufacture the belt 12 with precision as to spacing between grooves 46. This reduces the cost of making the belt and, of course, the crush shaping technique herein disclosed costs far less than would precision machining of lip 64 to mate with a precision manufactured belt 12.

The lip 64 and wall 26 preferably have a definite thickness (dimension lengthwise of the path of travel of belt 12) such at least as to completely cover a molding cavity 62 as the latter passes through the lip. Obviously with molding cavities such as shown in FIG. 4 such covering of the cavities would require at the minimum a lip portion 64 only a few thousandths of an inch thick. However as will be discussed below molding cavities of different shape or disposition may be used,, requiring thicker lips to cover them and prevent leakage. As a practical matter for tiny molded shapes such as involved in the flexible fastener field the thickness of the lip portion 64 will be such as to span and cover a large number of successive cavities at any given moment.

Referring back to FIG. 3 the upstream or entrance wall 26 of the vacuum chamber 24 and the contoured lip portion 64 thereof are shown in position on the machine of FIG. 1. Because of the accurate contouring of the lip 64 and the consequent snug sliding fit with belt 12 very little occluded air will be carried into the vacuum chamber 24 on the belt surfaces. The air included in molding recesses 62 will be carried into the chamber 24 and will be effectively reduced in quantity by the action of the vacuum pump attached to line 25 as described above.

The portion of the belt 12 within the vacuum chamber 24 is now thoroughly preheated by drum 14 and heater 44 and and is substantially devoid of air. Thus it is in most advantageous condition for introduction into the extruder nozzle 18 by passage through the wall 20 (see FIG. 1). The wall 20 is provided with a contoured lip portion 70 which is identical with the lip portion 64 of wall 26. The snug sliding fit between the lip 70 and belt 12 will prevent the molten plastic material within nozzle 18 from flowing upstream towards the vacuum chamber 24. The portion of the belt 12 which enters nozzle 18 is fully exposed to the molten plastic material therein and, since it is substantially devoid of air there is substantially no resistance to the entry of the molten plastic material into the tiny molding recesses 62 within each groove 46.

The nozzle 18 is connected through a line 72 to a suitable source of molten plastic material under suitable liquid pressure. A preferred plastic material is nylon of any one of the various types available at the present time, the differences in type and/or amounts of filling or other materials being availed of to form products of varying degrees of stiffness, chemical resistance, thermal stability and the like. The usual source of molten plastic material is a commercial extruder in which liquid pressure is accurately maintained by positive feeding means such as a screw conveyor. For the present invention very low pressure is required inasmuch as there are no deep recesses to be filled. Since this is the case the nozzle 18 need not be pressed against belt 12 with very great pressure to assure against leakage. To form metal lips herein used consequently will have a long service life. The fact that the lips, such as 64 and 70 are made of nonporous foam metal assures no leakage of air or plastic material into or through the bodies of such lips.

Figure 5:
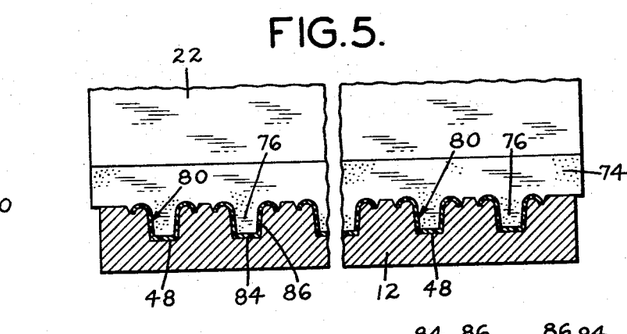
FIG. 5 is a vertical sectional view taken along the line 5–5 in FIG. 1.
Figures 7, 10, 11:
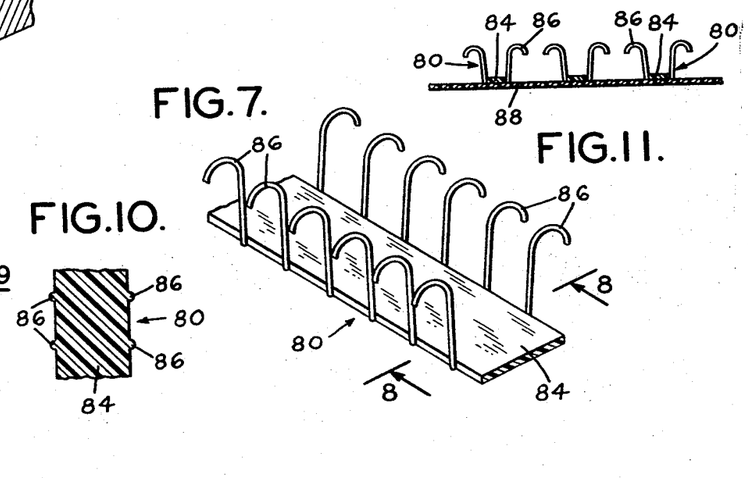
FIG. 7 is a greatly enlarged perspective view of a fragment of the product extruded and molded in the groove and molding recesses illustrated in FIG. 4.
FIG. 10 is a horizontal sectional view taken along the line 10–10 in FIG. 8.
FIG. 11 is a vertical sectional view of a fragment of a final product of the present invention, the product being enlarged to a much smaller extent than FIGS. 7 through 10, whereby several rows of strips with hook pile are shown on a base sheet.

Referring now to FIG. 5 in which the view is looking upstream towards the exit wall 22 of nozzle 18, it will be observed that such wall is provided with a contoured lip portion 74 similar to the lip portions 64 and 70 discussed above. This lip portion may be made of foam metal in the manner described above. However, there is one essential difference in that the projections 76 of lip 74 do not extend all the way to the bottom walls 48 of the grooves 46. Such spaces are deliberately left to serve as extruding slits for the formation of extruded plastic strips or ribbons to which the hook elements molded in recesses 62 are integrally attached thus making a molded and extruded product as shown in FIG. 7.

In FIG. 5 plastic material 80 is shown in section. It will be apparent that such material lies in the molding recesses 62 and in the horizontal spaces between projections 76 of lip 74 and the bottom walls 48 of grooves 46. Thus the plane in which belt 12 is transversely sectioned in FIG. 5 is the same as in FIG. 4, in both of which instances a pair of molding recesses 62 has been cut vertically in half.

To provide the horizontal spaces just described for extrusion of ribbons of plastic reference is made to FIG. 22. The lip 64 therein shown has projections 68 of a length established by the depth of the grooves 46 of belt 12. To make the lip 74 for the exit wall 22 of nozzle 18 a lip is first made exactly like the lip 64 shown in FIG. 22. After this contoured lip is withdrawn from the belt 12 the ends of each projection (68 in FIG. 22) are cut or ground off in a plane indicated by the broken line 82 in said FIG. 22. These projections thus become the shortened projections shown at 76 in FIG. 5. Obviously the extent to which the projections are shortened establishes the thickness of the ribbon extruded through the slitlike space thus afforded as shown in FIG. 5. Shortening of the projections 76 also may be performed by crushing the lower edge of a lip like 64 in FIG. 22 against a smooth plane surface to cause local collapse of the foam structure of the metal adjacent the ends of such projections.

As portions of the belt 12 progressively move out from beneath the lip portion 74 of the downstream or exit wall of the nozzle 18 the action of the contoured lip portion 74 has been to strip the molten plastic material off of all surfaces of the belt 12 against which some portion of lip 74 is pressed. As indicated in FIG. 5 the plastic material not stripped from belt 12 lies only in the molding recesses 62 and on the upper surface of the bottom wall 48 of each groove 46. As the belt 12 with such remaining plastic material 80 thereon passes through cooling air chamber 30 (FIG. 1) a stream of cooling air is conducted onto the belt and plastic to rapidly start cooling of both belt and plastic. Cooling air supplied to the chamber 30 passes with the belt 12 and plastic 80 beneath the exit wall 32 of chamber 30, such wall terminating somewhat above the surface of the belt to permit exit of the air as indicated by the arrow in FIG. 1. The belt 12 with plastic material 80 then moves progressively over the cooling device 38 for completion of the cooling and solidification of the plastic material 80.

Figure 8:
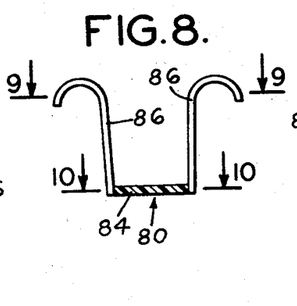
FIG. 8 is a vertical sectional view taken along the line 8–8 in FIG. 7.
Figure 9:
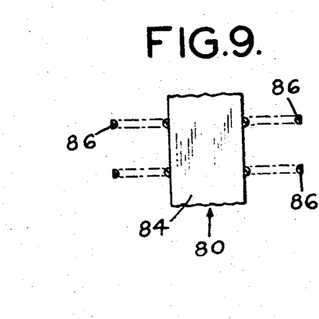
FIG. 9 is a horizontal sectional view taken along the line 9–9 in FIG. 8.

The plastic product 80 which is found in each groove 46 is shown in FIGS. 7 through 10. It comprises a continuous strip or ribbon 84 of extruded plastic material and two rows of oppositely facing hook-shaped pile elements 86. Each pile element 86 is integrally joined at its base with the strip 84 as is clearly shown in FIG. 10. FIG. 8 shows how the pile elements diverge due to the slope of the walls 50 and 52 (FIG. 4) in which the molding recesses 62 are formed. As most clearly shown in FIG. 9 the pile elements 86 are each semicircular in cross-sectional shape. This, of course is due to the illustrated shape of the molding recesses 62 and to the fact that the lip 74 (FIG. 5) has scraped across each molding recess 62 thus forming a flat side on each molded pile element 86.

The final product shown in FIG. 11 comprises a large number of the plastic products 80 lying in parallel rows and being adhered to a suitable base sheet 88.

To form the final product shown in FIG. 11 continuously as the plastic products 80 are produced by the machine shown in FIG. 1, there is also shown in FIG. 1 an illustrative arrangement for adhering a base sheet 88 to the plastic products. Thus, there is shown a take away roll 90, also see FIG. 6, which is formed with a plurality of circumferential ribs 92 spaced axially of the roll in such manner that one rib 92 will enter each of the grooves 46 of belt 12, throughout the width thereof. The take away roll 90 is mounted for rotation about an axis 94 with the ribs 92 meshing with grooves 46 as described above. The circumferential surface of each rib 92 thus will bear upon one of the strips 84 of a plastic product 80 as the latter reaches the point at which the take away roll 90 is positioned. All of the products 80 are then conducted upwardly upon the ribbed surface of take away roll 90. As shown in FIG. 6 each strip portion 84 of each product 80 lies on the surface of a rib 92 and the hook-shaped pile elements 86 extend radially inwardly, standing freely in the grooves 94a of the ribbed take away roll 90.

A continuous web of the base sheet material 88 is drawn from a supply, not shown, by a combined feed and pressure roll 96 preferably jacketed with rubber or other elastomer, which is pressed toward take away roller 90 by a suitable pressure means such as an air cylinder 98. The web 88 is fed over an adhesive applying roll 100 rotating in a bath of adhesive 102. A backing roll 104 presses web 88 against the applying roll 100 whereby a coating of adhesive material is continuously applied to web 88 as the latter proceeds toward the pressure roll 96. At the point of tangency (FIG. 6) between roll 96 and take away roller 90 the adhesive coated surface of web 88 is pressed into engagement with the exposed surfaces of the strip portions 84 of all of the plastic products 80. The combined web 88 and products 80 then are conducted through suitable cooling or drying devices 106, if required, to set the adhesive. The final product is then reeled or further processed as may be appropriate.

Figures 12, 13:
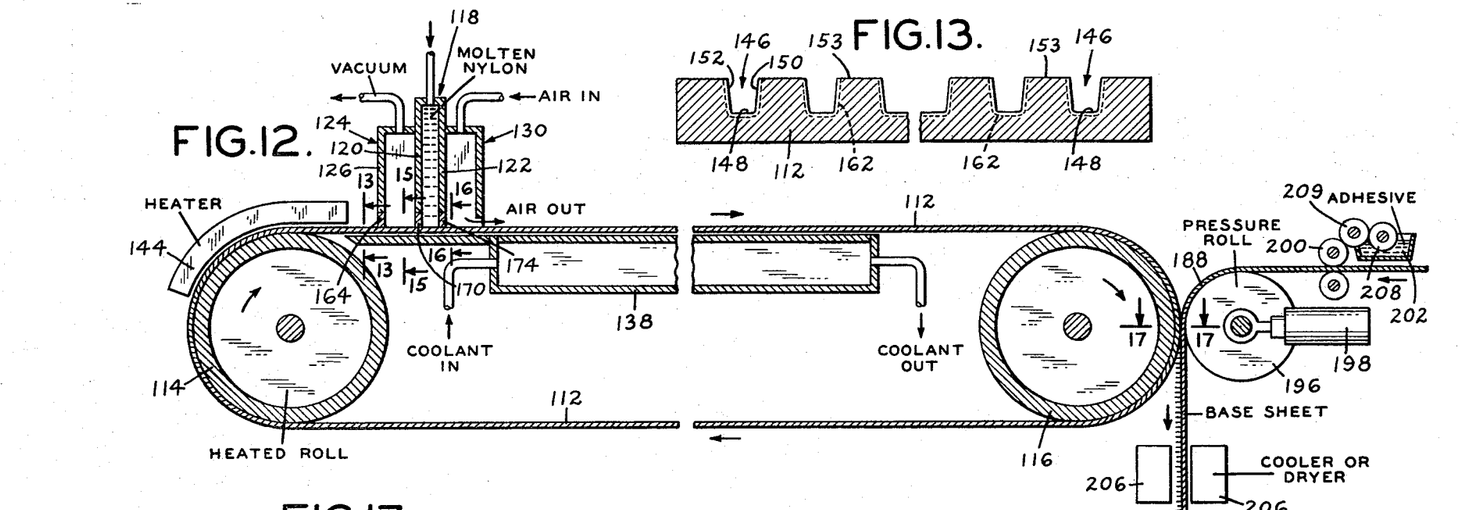
FIG. 12 is a side elevational view similar to FIG. 1, but showing a machine of modified form.
FIG. 13 is a vertical sectional view taken along the line 13–13 in FIG. 12.

A modified apparatus embodying the present invention is shown in FIG. 12. Those parts in this and related figures which correspond with or are identical with parts already described in connection with the first embodiment are identified by the same reference numeral used in the first embodiment plus 100. Identical parts will not be described again in this portion of the specification.

In general, the machine shown in FIGS. 12 through 17 differs from the machine in FIG. 1 only in the contour of the belt 112, the contour of the foam metal lips 164, 170 and 174 and the apparatus for assembling the molded and extruded plastic product with a base sheet.

Referring first to FIGS. 13 and 14 the belt 112 is provided with a plurality of parallel grooves 146 running lengthwise of the belt. As illustrated the grooves are provided with generally flat upwardly diverging sidewalls 150 and 152 and a generally flat bottom wall 148. The intersection of sidewalls 150 and 152 with bottom wall 148 may be slightly rounded as illustrated. On the other hand the rounding may be much greater and indeed the bottom wall 148 could form a continuous curve. The specific shape is not critical as will be apparent. Molding recesses 162 are sunk into the sidewalls 150 and 152 and continue across the bottom wall 148 as is best shown in FIG. 14. These molding recesses may be formed by spark etching or other techniques as described above. The ridges between the grooves 146 in belt 112 are identified by the reference numeral 153 and these surfaces are flat and horizontally disposed, it being noted that each of the molding recesses 162 open into a surface 153 as a semicircular notch corresponding with the cross-sectional shape of the molding recesses.

The belt 112 is utilized for the production of a plastic product 180 shown in FIGS. 18 and 19. Such plastic product comprises extruded plastic strips or ribbons 184 and integral molded loop pile elements 186 most clearly shown in FIG. 18. As will be apparent the molded loop pile elements have been formed in the molding recesses 162 of FIG. 14 and the continuous strips or ribbons 184 have been extruded onto the flat upper surfaces 153 of the ridges lying between adjacent grooves 146.

Referring back to FIG. 12 the upstream or entering wall 126 of the vacuum chamber 124 is provided with a contoured lip 164 which must bear downwardly upon the belt 112 and form a substantially airtight seal therewith, all as described above in connection with the first modification. The upstream or entering wall 120 of the extruder nozzle 118 is provided with a contoured lip 170 which similarly must form substantially an air and liquidtight seal with the belt. Thus the lips 164 and 170 will be identical. The downstream wall 122 of the extruder nozzle 118 is provided with a contoured lip 174. This lip differs from the lips 164 and 170 only in that is provides a slitlike space above the surfaces 153 (FIG. 14) of the belt 112, such space being provided for the extrusion therethrough of the plastic strips or ribbons 184 (FIG. 18).

While the lips 164, 170 and 174 may be made to conventional machining procedures it is preferred to make such lips of a suitable nonporous foam metal which is shaped by a crushing technique, the crushing being carried out upon the particular belt with which the lips are to be used, all as described in greater detail hereinabove.

Figure 15:
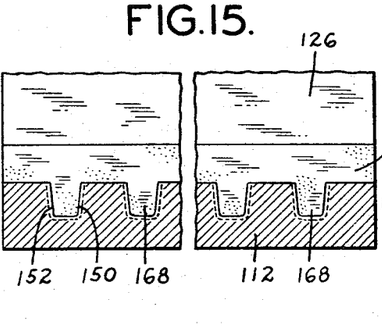
FIG. 15 is a vertical sectional view taken along the line 15–15 in FIG. 12.

In FIG. 15 the lip 164 of wall 126 is shown snugly fitting with the contour of the belt 112. Thus the lip 164 has a plurality of slightly tapered projections 168 which fit down into the grooves 146 and press against the bottom walls 148 thereof. The lip 170 on wall 120 of the extruder nozzle is identical with lip 164 shown in FIG. 15.

Figure 16:
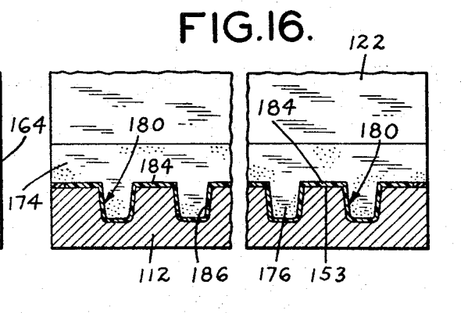
FIG. 16 is a vertical sectional view taken along the line 16–16 in FIG. 12.

In FIG. 16 the downstream wall 122 of the extruder nozzle with its lip 174 is illustrated in operative relation with the belt 112. Thus a plastic product 180 is illustrated in the spaces afforded for the retention or extrusion of plastic material. The portions of the plastic material which extend downwardly and across the bottom of each groove 146 constitute the loop pile elements 186. The portions of the plastic which lie on top of the ribs between grooves 146 comprise the continuous ribbons or strips 184. From a consideration of FIGS. 15 and 16 it will be recognized that the lip 174 in FIG. 16 has slightly tapered projections 176 extending into the grooves 146 of the belt. These projections provide a snug sliding fit with all three walls of each groove and thus strip those walls of plastic leaving only the plastic material which has been deposited in the molding recesses 162. The projections 176 of lip 174 are slightly longer than the extensions 168 of the lip 164 shown in FIG. 15. The added length of the projections 176 affords the space through which the ribbon or strip 184 is extruded outwardly of the nozzle to form the product 180.

Figure 23:
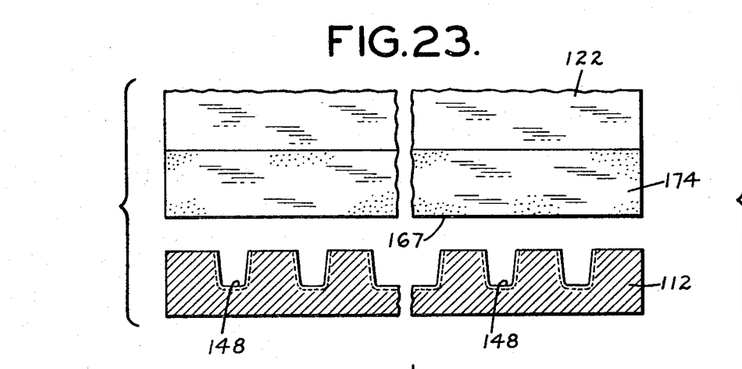
FIGS. 23 and 24 are views similar to FIGS. 20, 21 and 22 but illustrating the procedure for forming another type of nozzle lips.
Figure 24:
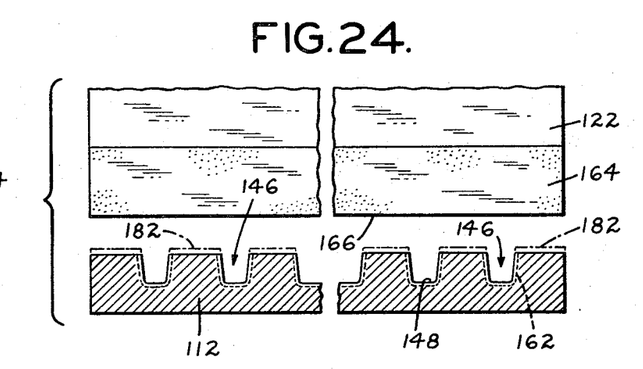

In FIGS. 23 and 24 a method of making the lips 164 and 174 is diagrammatically illustrated. The metal belt 112 which is to be used is mounted on spaced rolls such as or similar to the rolls 114 and 116 in FIG. 12 and is driven slowly through its endless path as described above. The wall 122 with the lip 174 in blank form secured thereto is now pressed downwardly upon the belt 112 to cause the combined crushing and burnishing operation as described above. Pressure is continued until the remaining portions of the lowermost edge 167 of the lip 174 reach the bottom walls 148 of the grooves. The result of this procedure is to form the lip 174 shown in FIG. 16 and which must have projections 176 of such length as to leave extruding space for the ribbons 184. The most practical manner of achieving this result is diagrammatically indicated in FIG. 24. The belt 112 after having performed the crush shaping procedure described in FIG. 23 is now ground off to an extent indicated by the broken line 182, the particular extent being such as to form ribbons 184 of the desired thickness. For example if the ribbons 184 are to be 0.003" thick one would grind this amount off the tops of all of the ribs of belt 112. Belt 112 with the somewhat lowered ribs is now what will be run in the machine. Therefore the lips 164 and 170 which must seal tightly with the belt are crush formed against the belt 112 after the ribs have been ground down. As indicated in FIG. 24 the wall 122 with a foam metal lip 164 in blank form attached thereto is now pressed down upon the belt 112 until such time as the remaining portions of the lower edge 166 thereof reach the bottom walls 148 of all of the grooves 146. The same procedure is used for shaping the lip 170 on the upstream wall 120 of the extruder nozzle 118.

From FIG. 16 it will be apparent that the molded and extruded plastic product 180 is an integral web made up of alternating strips 184 and loop pile elements 186. As the product 180 supported by belt 112 progresses away from the lip 174 of nozzle 118 is passes through cooling air chamber 130 (FIG. 12) and across the cooling device 138 during the course of which the product has solidified sufficiently to be removed from the belt 112.

The base sheet 188 is supplied in the form of a continuous web from a supply roll or other source (not shown). The web 188 passes beneath an adhesive supply device 202 with a dip roll 208, transfer roll 209 and application roll 200 backed by a backing roll 204. A coating of suitable adhesive is thus placed upon the upper surface of web 188 as viewed in FIG. 1 and the coated web then passes over a roll 196 preferably having a rubber or other elastomeric jacket pressed toward the belt 112 by means such as an air cylinder 198.

Figure 17:
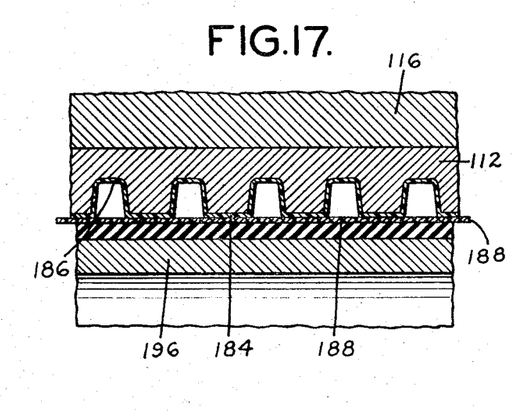
FIG. 17 is a horizontal sectional view taken along the line 17–17 in FIG. 12.

Referring now to FIG. 17 the adhesive-coated surface of web 188 is pressed, in the nip of rolls 196 and 116, against the extruded plastic strips 184. As shown in FIG. 12 the final product is then conducted through suitable cooling or drying apparatus 206 and then to the reel or further processing stations as so desired.

In the machine shown in FIG. 12 as well as that shown in FIG. 1 the securing of the base sheet web 188 or 88 to the molded product by adhesive is merely illustrative. Obviously any other suitable technique, such as ultrasonic welding for example, may be used.

In FIGS. 18 and 19 the final product is shown as comprising the base sheet 188 with strips 184 firmly adhered thereto and with the loop pile elements 186 standing upright. The horizontal sectional view in FIG. 19 shows that each pile element is semicircular in cross section and if formed integrally with the strips 184.

Figure 25:
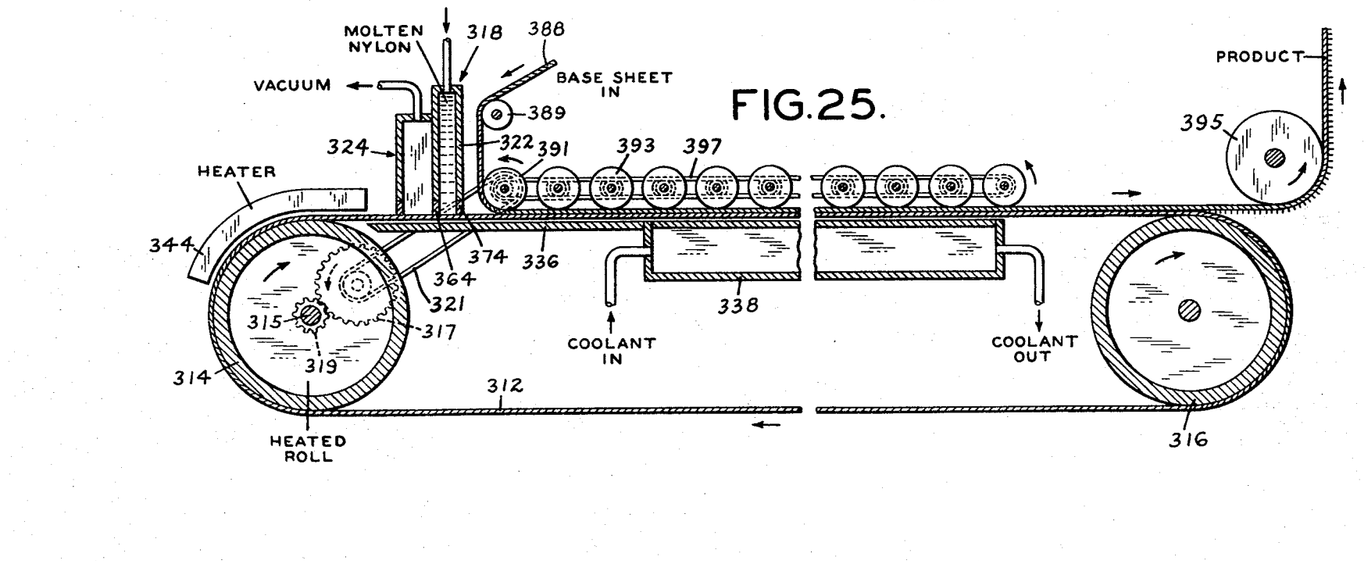
FIG. 25 is a side elevational view similar to FIGS. 1 and 12 but showing a machine of still another modified form.

A still further modified form of apparatus embodying the present invention is shown in FIG. 25. Parts of this machine which are identical with or similar to parts in the machine of FIG. 1 will be identified by the same reference numerals plus 300. Identical parts will not be described again in connection with FIG. 25.

In FIG. 25 the apparatus shown is arranged to assemble the molded and extruded product with a base sheet to form a final product without using an adhesive applicator such as illustrated in FIG. 1 or FIG. 12. A plastic material such as nylon which is rather viscous and tacky in molten condition is supplied to an extruder nozzle 318 to form a molded and extruded plastic product on a belt 312. The preferred type of product for the present embodiment is one which has ribbons or strips of plastic material lying upon the top surfaces of all of the ridges of the belt 312. A typical product of this type is that formed by the machine in FIG. 12 which, as illustrated in FIG. 16, includes continuous plastic strips 184 which have been extruded and lie on the top surfaces 153 of the ribs of belt 112.

As shown in FIG. 25 the apparatus includes a vacuum chamber 324 for removing occluded and included air from the belt 312 before it enters the nozzle 318. However, this embodiment does not include a cooling air chamber such as the chambers 30 and 130, respectively, in FIGS. 1 and 12. Thus the molded and extruded product emerging from the nozzle 318 is still hot and substantially in molten condition as it leaves the lip 374 of downstream nozzle wall 322 and moves towards the right with the belt 312, the latter being supported by the support plate 336.

A continuous web of base sheet material 388 coming from a supply, not shown, is guided over a roller 389 and downwardly towards the belt 312 in a vertical path quite close to the downstream wall 322 of nozzle 318, and thence under a press roller 391. The press roller 391 is the first of a series of similar rollers 393 all of which are driven at a surface speed identical with that of the belt 312. The rollers 391 and 393 preferably are adjustable vertically into fixed positions carefully related with the thickness of the strips of freshly extruded, molten plastic material on the ribs of belt 312. Thus the first press roller 319 brings the base sheet web 388 into contact with the extruded plastic material and presses it to a carefully controlled extent into such material, thereby causing adherence of the base sheet to the molten plastic material. As the belt 312 progresses it carries the plastic material and the base sheet successively beneath the rollers 393 and over the cooling device 338. During the latter period of time the plastic material progressively solidifies with the base sheet material firmly and permanently adhered thereto.

The final product emerging from the machine shown in FIG. 25 thus is similar in type to the product shown in FIGS. 18 and 19, for example. Such product may now be removed from belt 312 and guided towards a reel or further processing apparatus, as may be desired. A guide roll 395 is shown in FIG. 25 but it will be understood that the final product may be conducted away from the machine in any manner or direction desired.

The base sheet material 388 used in the embodiment shown in FIG. 25 preferably is a fabric, woven or nonwoven, having a porosity such as to permit a limited amount of the unsolidified plastic material to penetrate it to form a strong bond between the remaining plastic material and the backing sheet. Depending upon the particular porosity of a selected base sheet material 388 it may or may not be advisable to make the extruded ribbons or strips of plastic material somewhat thicker than they might be if they were to be formed in one of the embodiments herein in which an added adhesive material is used.

In FIG. 25 as is the the case in all illustrations herein of the apparatus, the driving means for the ribbed belt and other moving parts has been omitted. However, in FIG. 25, the press rollers 391 and 393 must move at the same surface speed as that of the belt and they should be mounted for accurate adjustment vertically with respect to the surface of belt 312. Therefore a diagrammatic showing has been made of apparatus suitable for this purpose. In FIG. 25 the press rollers 391 and 393 are driven from the shaft 315 of belt guide roller 314 through a pinion 317 and gear 319 connected by a belt or chain 321 to the roller 391. The rollers 393 are each driven by a common drive belt or chain 397 suitably connected with the driven roller 391. The rollers 391 and 393 may be mounted in a frame, not shown, which is adjustable relative to the belt 312. As will be apparent the particular form of driving means for the rollers 391 and 393 may take any form suitable for driving rollers which are mounted for the vertical adjustment described above.

In the foregoing description the embodiment of the apparatus shown in FIG. 1 has been described in connection with the manufacture of a product having pile elements 86 in the form of hooks while in the apparatus shown in FIG. 12 the pile elements 186 are in the form of loops. Also, the apparatus in FIG. 25 has been described in connection with the manufacture of a product similar to that manufactured in the apparatus of FIG. 12. As already noted the extruded strips or ribbons are laid in the bottoms of the belt grooves in the FIG. 1 embodiment and on top of the ribs of the belt in the embodiments of FIGS. 12 and 25. However this difference has no bearing upon whether the molded pile elements are to be hooks or loops or of some other shape having a decorative or utilitarian function.

From a consideration of FIG. 4 it will be realized that the molding recesses 62 terminate short of the centerline of the adjacent rib only because it is desired to mold hook-shaped pile elements in such recesses. If so desired, loop-shaped pile elements could be manufactured in this embodiment of the invention by simply extending the molding recesses 62 on over the tops of the ribs. Similarly the mold recesses 162 in FIG. 14 extend all the way across the bottom wall 148 and thus serve to mold continuous loops. However, by terminating the recesses 162 short of the centerline of bottom wall 148 the pile elements molded therein would be L-shaped and by contouring the bottom walls 148 as inverted images of the tops of ribs in belt 12 (FIG. 4) the pile elements molded in belt 112 would be hooks very similar to those made in belt 12.

The production rate of any of the forms of apparatus disclosed herein can be quite rapid since all parts move continuously. The actual linear speed of the belt 12, 112 or 312 is largely determined by the amount of time required for cooling and solidification to desired degree of the plastic material. The length of the belt, the length of the cooling device 38, 138 or 338 and the thermal characteristics of the belt must all be taken into consideration. A particular advantage of the present invention is that the belt 12, 112 or 312 is made of very thin sheet metal which can be cycled through a rather wide temperature range very rapidly. It will be recalled that, In FIG. 1 for example, the belt 12 is heated on heated roll 14 and by the heater 44 to a temperature, preferably, close to the elevated temperature of the molten plastic material which is to be placed on the belt 12 by extruder nozzle 18. From the extruder 18 the belt 12 enters cooling zones. In both instances the change in temperature of the belt is accomplished rapidly because of the thinness of the metal body.

The belt 12, 112 or 312 will expand and contract with changes in temperature and this is particularly noticeable in the direction transverse the path of travel of the belt. However, from a consideration of FIG. 1, for example, it will be recognized that there will not be a great change in temperature of the portion of the belt which at any given moment is passing through the vacuum chamber 24 and nozzle 18 since the belt has been preheated substantially to the temperature of the molten nylon supplied by nozzle 18. Consequently there will be little, if any, change in widthwise dimension of the affected portion of the belt as it passes successively through the lips 64, 70 and 74. Thus, if the lips aforesaid are to be machined from solid metal they should be dimensioned for proper fit with the belt when belt and lips are at operating temperature, taking into account the probably differing coefficients of thermal expansion of the two metals used for lips and belt. When such coefficients differ to any substantial degree it is imperative that the nozzle 18 and vacuum chamber 24 be removed from the belt 12 at the end of a production run and not brought back into contact therewith until both belt 12 and the nozzle-vacuum assembly 18, 24 is preheated to operating temperature.

When the lips 64, 70 and 74, for example, are made of crush-shaped foam metal as described above the inherent yieldability of the foam structure is such as to permit the lips and belt to remain in contact over relatively wide ranges of temperature. Ordinarily therefore, it should not be necessary to observe all of the precautions in original manufacture of the parts or in operation of the machines disclosed herein with respect to thermal expansion.

The take away roll 90 shown in FIG. 1 has ribs 92 which fit into the grooves 46 of belt 12 in order to guide the molded products 80 out of the belt grooves. There is no problem to thermal expansion at this point in the machine since the belt 12 has been cooled to a temperature not greatly different from the ambient air temperature. Also, a precise fit is not required. Therefore the ribs 92 may be formed on a solid metal drum by grooving the drum by conventional machining operations.

The loops or hooks chosen for illustration herein of the general sort of pilelike elements which may be molded in accordance with the present invention are shown in FIGS. 11 and 19 as standing substantially vertically with respect to the extruded ribbons 84 and 184 respectively. As will be apparent such elements could be molded to slant forwardly or backwardly relative to the path of travel of the belt, 12, 112 or 312 in which they are molded. In such event the mold recesses, 62 in FIG. 4 for example would be sunk in the walls 50 and 52 in an appropriately inclined position. Such inclining will increase the effective longitudinal dimension of the recesses in the direction of travel of the belt 12. Thus the effective longitudinal dimension of the lips 64, 70 and 74 in FIG. 1, for example, must be so chosen as to assure that at least one and preferably several of the discrete, longitudinally spaced molding recesses 62 will be covered over by the lips. This, as noted above is desirable in order to prevent leakage of air or molten plastic material into the vacuum chamber 24.

The particular shape of the plastic pilelike elements to be made in accordance with the present invention may be chosen from a very wide variety bearing in mind that a particular advantage of this invention is that the mold recesses may be shallow elongated open troughs each having widths and depths which are only a small fraction of the length thereof. In order to prevent leakage of air or molten plastic material lengthwise of the belt as it passes through the extruder nozzle the molding recesses should be discrete, that is spaced and not interconnecting in a direction lengthwise of the belt.

When the molding recesses 62 or 162 are discrete as shown herein and have such dimensions and are so arranged that the entrance lips 64, 164 or 364 will completely seal them off the vacuum chambers 24, 124 or 324 perform the useful function, as described above, of reducing the amount of air carried by the recesses into the nozzle 18, 118 or 318. However, when the product to be manufactured requires molding recesses of great effective lengthwise dimensions or requires recesses which are interconnected, rather than discrete, in either event making it impractical to seal off the recesses entering the nozzle beneath entrance lips 64, 164 or 364 the vacuum chambers aforesaid may be omitted or, at least, not used or not used under high suction. It will be understood that such lengthy or interconnected molding recesses would afford continuous small passageways from the nozzle upstream to the vacuum chamber and that with high suction there would be a possibility that molten plastic materials of some types would be caused to flow upstream into the vacuum chamber. However when nylon is used there is little concern about this problem because, when molten, nylon is quite viscous and, especially when the belt 12, 112 or 312 is traveling at reasonably high linear speed, the viscous molten nylon flowing downwardly onto the belt within nozzle 18, 118 or 318 will tend to squeeze included air upstream through the small passageways aforesaid rather than tend to flow upstream through them whether or not a moderate amount of air is being removed from the vacuum chamber 24, 124 or 324.

The method of crush forming the lips of extruder nozzles 18, 118 and 318 from foam metal, which is disclosed herein as a preferred but alternative procedure, is not claimed herein as part of the present invention. Such method forms a part of the invention disclosed and claimed in my copending application Ser. No. 840,772 filed July 10, 1969.

What I claim is:

1. Apparatus for molding plastic articles comprising
  an endless belt,
  means for continuously driving said belt longitudinally through an endless path,
  said belt having formed in one surface thereof a plurality of alternating ribs and grooves extending lengthwise of said path of said belt,
    at least some of the surface portions of said ribs and grooves having molding recesses sunk therein, and
  means for supplying plastic material in moldable condition under pressure to said surface of said belt in which said ribs and grooves are formed including
    a nozzle having spaced parallel lips defining a narrow slit-like opening with the lengthwise dimension of said opening extending transversely of the path of travel of said belt whereby one of said lips constitutes an entrance lip and the other of said lips constitutes an exit lip as related to the travel of said belt through said endless path,
  means for positioning said entrance and exit lips in contact with the surface of said belt in which said ribs and grooves are formed,
  said entrance lip having a contour defined by alternating notches and projections formed in said entrance lip such as to engage with a snug sliding fit all surfaces of said ribs and grooves, and
  said exit lip having a contour defined by alternating notches and projections formed in said exit lip such as to engage with a snug sliding fit at least a portion of those surfaces of said ribs and grooves in which said molding recesses are sunk,
  whereby as successive portions of said belt travel beneath said exit lip said exit lip will scrape plastic material off of the surfaces which are engaged by said exit lip while leaving plastic material remaining in all of said molding recesses.

2. Apparatus in accordance with claim 1 in which at least some of the projections formed in said exit lip have a length insufficient to penetrate the full depth of the associated grooves of said belt whereby to define in the lower portions of said associated grooves a plurality of extruding spaces of predetermined vertical dimension through which said plastic material will be extruded from said nozzle in the form of a plurality of parallel continuous strips of thicknesses corresponding with said predetermined vertical dimension and lying in the bottom of each of said associated grooves.

3. Apparatus in accordance with claim 2 in which said molding recesses are so positioned in said belt that each such recess communicates with at least one of said extruding spaces whereby plastic material remaining in said molding recesses is integrally joined with plastic material extruded into at least one of said extruding spaces.

4. Apparatus in accordance with claim 1 in which at least some of the projections formed in said exit lip have a length greater than that required to penetrate the full depth of the associated grooves of said belt whereby to define above the ribs adjoining said associated grooves extruding spaces of predetermined vertical dimension through which plastic material will be extruded from said nozzle in the form of a plurality of parallel continuous strips having thicknesses corresponding with said predetermined vertical dimension and lying on each of said ribs adjoining associated grooves.

5. Apparatus in accordance with claim 4 in which said molding recesses are so positioned in said belt that each such recess communicates with at least one of said extruding spaces whereby plastic material remaining in said molding recesses is integrally joined with plastic material extruded into at least one of said extruding spaces.

6. Apparatus for molding plastic articles comprising
  an endless belt,
  means for continuously driving said belt longitudinally through an endless path,
  said belt having formed in one surface thereof a plurality of alternating ribs and grooves extending lengthwise of said path of said belt,
    at least some of the surface portions of said ribs and grooves having a plurality of longitudinally spaced discrete molding recesses sunk therein,
    at least some of said molding recesses being in the form of elongated shallow troughs having widths and depths only a small fraction of the lengths thereof, and
  means for supplying plastic material in moldable condition under pressure to said surface of said belt in which said ribs and grooves are formed including
    a nozzle having spaced parallel lips defining a narrow slit-like opening with the lengthwise dimension of said opening extending transversely of the path of travel of said belt whereby one of said lips constitutes an entrance lip and the other of said lips constitutes an exit lip as related to the travel of said belt through said endless path,
  means for positioning said entrance and exit lips in contact with the surface of said belt in which said ribs and grooves are formed,
  said entrance lip having a contour defined by alternating notches and projections formed in said entrance lip such as to engage with a snug sliding fit all surfaces of said ribs and grooves and said lip having a dimension in the direction of travel of said belt which is greater than the maximum effective dimension in said direction of any of said discrete molding recesses,
  whereby successive portions of said belt may travel beneath said entrance lip and into the plastic material within said nozzle without leakage of plastic material between said belt and said entrance lip, and said exit lip having a contour defined by alternating notches and projections formed in said exit lip such as to engage with a snug sliding fit at least a portion of those surfaces of said ribs and grooves in which said molding recesses are sunk, whereby as successive portions of said belt travel beneath said exit lip said exit lip will scrape plastic material off of the surfaces which are engaged by said exit lip while leaving plastic material remaining in all of said molding recesses.

7. Apparatus in accordance with claim 6 in which at least some of the projections formed in said exit lip have a length insufficient to penetrate the full depth of the associated grooves of said belt whereby to define in the lower portions of said associated grooves a plurality of extruding spaces of predetermined vertical dimension through which said plastic material will be extruded from said nozzle in the form of a plurality of parallel continuous strips of thicknesses corresponding with said predetermined vertical dimension and lying in the bottom of each of said associated grooves.

8. Apparatus in accordance with claim 7 in which said molding recesses are so positioned in said belt that each such recess communicated with at least one of said extruding spaces whereby plastic material remaining in said molding recesses is integrally joined with plastic material extruded into at least one of said extruding spaces.

9. Apparatus in accordance with claim 6 in which at least some of the projections formed in said exit lip have a length greater than that required to penetrate the full depth of the associated grooves of said belt whereby to define above the ribs adjoining said associated grooves extruding spaces of predetermined vertical dimension through which plastic material will be extruded from said nozzle in the form of a plurality of parallel continuous strips having thicknesses corresponding with said predetermined vertical dimension and lying on each of said ribs adjoining associated grooves.

10. Apparatus in accordance with claim 9 in which said molding recesses are so positioned in said belt that each such recess communicates with at least one of said extruding spaces whereby plastic material remaining in said molding recesses is integrally joined with plastic material extruded into at least one of said extruding spaces.

11. Apparatus in accordance with claim 6 in which the grooves formed in said belt are defined by a generally horizontally disposed bottom wall and opposed upwardly diverging sidewalls, in which the ribs formed in said belt are defined by the sidewalls of two adjacent grooves and a generally horizontally disposed top wall, and in which those of said molding recesses which are in the form of elongated troughs include portions which are sunk into the sidewalls of at least some of said grooves and extend upwardly from the bottom wall of each of those grooves in which said portions of said molding recesses are sunk.

12. Apparatus in accordance with claim 3 in which means is provided in the path of said belt in a zone downstream of said nozzle for converting the plastic material in said molding recesses and in said continuous strips from moldable condition to solid condition, and in which means is provided in the path of said belt in a zone further downstream of said nozzle for engaging and removing said plastic material in solid condition from said belt, said last named means including a rotatable roll having plurality of circumferential ribs so spaced that one of said circumferential ribs will engage each of said continuous strips of plastic material and carry said strips away from said belt with the solidified plastic material from said molding recesses projecting into the spaces between circumferential ribs on said rotatable roll.

13. Apparatus in accordance with claim 12 in which there is provided means for supplying a continuous web of flexible sheet material having adhesive material on one surface thereof, and means for pressing said surface of said web into adhesive engagement with said strips of plastic material while said strips are being carried by said rotatable roll.

14. Apparatus in accordance with claim 5 in which there is provided means for guiding a continuous web of flexible sheet material into face-to-face contact with said strips of plastic material while they lie on the ribs of said belt, and means for securing said strips to said web.

15. Apparatus in accordance with claim 14 in which said means for securing said strips to said web includes means for applying adhesive material to one surface of said web and means for pressing said surface of said web against said strips.

16. Apparatus in accordance with claim 14 in which said means for securing said strips to said web includes a plurality of pressure rolls for pressing said web against said strips while the plastic material of which said strips consist is in moldable condition.

17. Apparatus in accordance with claim 1 specifically designed for the manufacture of molded plastic hooks, wherein at least some of said molding recesses are in the form of troughs each having a portion extending generally vertically with respect to the bottoms of said grooves and a portion extending generally transversely with respect to the bottoms of said grooves, said last-named portion having a closed end to define the free end of a hook molded therein.

18. Apparatus in accordance with claim 1 specifically designed for the manufacture of molded plastic loops, wherein at least some of said molding recesses are in the form of troughs each having two spaced portions extending generally vertically with respect to the bottoms of said grooves and a portion which serves to interconnect said two spaced portions and which extends generally horizontally with respect to the bottoms of said grooves.

19. Apparatus in accordance with claim 2 specifically designed for the manufacture of molded plastic hooks integral with and extending generally vertically with respect to the parallel continuous strips of plastic material extruded into the extruding spaces at the bottoms of said grooves, wherein at least some of said molding recesses are in the form of troughs each having a portion communicating with one of said extruding spaces and extending generally vertically with respect to the bottoms of said grooves and a portion extending generally horizontally with respect to the bottoms of said grooves, said last-named portion having a closed end to define the free end of a hook molded therein.

20. Apparatus in accordance with claim 2 specifically designed for the manufacture of molded plastic loops integral with and extending generally vertically with respect to the parallel continuous strips of plastic material extruded into the extruding spaces at the bottoms of said grooves, wherein at least some of said molding recesses are in the form of troughs each having two spaced portions communicating with at least one of said extruding spaces and extending generally vertically with respect to the bottoms of said grooves and a portion which serves to interconnect said two spaced portions and which extends generally horizontally with respect to the bottoms of said grooves.

21. Apparatus in accordance with claim 4 specifically designed for the manufacture of molded plastic hooks integral with and extending generally vertically with respect to the parallel continuous strips of plastic material extruded into the extruding spaces above the ribs of said belt, wherein at least some of said molding recesses are in the form of troughs each having a portion communicating with one of said extruding spaces and extending generally vertically with respect to the bottoms of said grooves and a portion extending generally horizontally with respect to the bottoms of said grooves, said last-named portion having a closed end to define the free end of a hook molded therein.

22. Apparatus in accordance with claim 4 specifically designed for the manufacture of molded plastic loops integral with and extending generally vertically with respect to the parallel continuous strips extruded into the extruding spaces above the ribs of said belt, wherein at least some of said molding recesses are in the form of troughs each having two spaced portions communicating with at least one of said extruding spaces and extending generally vertically with respect to the parallel continuous strips extruded into the extruding spaces above the ribs of said belt, wherein at least some of said molding recesses are in the form of troughs each having two spaced portions communicating with at least one of said extruding spaces and extending generally vertically with respect to the bottoms of said grooves and a portion which serves to interconnect said two spaced portions and which extends generally horizontally with respect to the bottoms of said grooves.

23. Apparatus in accordance with claim 13 specifically designed for the manufacture of a product comprising said continuous web of flexible sheet material with said strips of plastic material secured by said adhesive engagement to one surface of said flexible sheet material and with molded plastic hooks integral with and extending generally vertically with respect to said strips of plastic material, said product being useful as the hook part of a flexible fastener of the hook-and-loop type, wherein at least some of said molding recesses are in the form of elongated troughs each having a portion extending generally vertically with respect to the bottoms of the grooves in said belt and one end of which portion communicates with one of said extruding spaces in the lower portions of said grooves of said belt, and each of said troughs having a portion extending generally horizontally with respect to said one extruding space, said last-named portion having a closed end to define the free end of a hook molded therein.

24. Apparatus in accordance with claim 14 specifically designed for the manufacture of a product comprising said continuous web of flexible sheet material with said strips of plastic material secured to one surface of said flexible sheet material and with molded plastic hooks integral with and extending generally vertically with respect to said strips of plastic material, said product being useful as the hook part of a flexible fastener of the hook-and-loop type, wherein at least some of said molding recesses are in the form of elongated troughs each having a portion extending generally vertically with respect to the bottoms of the grooves in said belt and one end of which portion communicates with one of said extruding spaces above the ribs of said belt, and each of said troughs having a portion extending generally horizontally with respect to said extruding space, said last named portion having a closed end to define the free end of a hook molded therein.

UNITED STATES PATENT OFFICE
CERTIFICATE OF CORRECTION

Patent No. 3,594,863          Dated July 27, 1971

Inventor(s) George H. Erb

It is certified that error appears in the above-identified patent and that said Letters Patent are hereby corrected as shown below:

| | | |
|---|---|---|
| Col. 3, line 69 | "wide" should be | --width-- |
| Col. 4, line 59 | "my" should be | --by-- |
| Col. 6, line 21 | ",," should be | --,-- |
| Col. 6, line 38 | "and and" should be | --and-- |
| Col. 6, line 64 | "To form" should be | --The foam-- |
| Col. 9, line 11 | "to" should be | --by-- |
| Col. 10, line 3 | "is" should be | --it-- |
| Col. 10, line 31 | "if" should be | --is-- |
| Col. 10, line 72 | "319" should be | --391-- |
| Col. 11, line 25 | "the the" should be | --the-- |
| Col. 12, line 8 | "In" should be | --in-- |
| Col. 13, line 39 | "a" first occurrence, inserted before --part-- | |
| Col. 15, line 25 | "communicated" should be | --communicates-- |

Signed and sealed this 21st day of March 1972.

(SEAL)
Attest:

EDWARD M. FLETCHER, JR.
Attesting Officer

ROBERT GOTTSCHALK
Commissioner of Patents